United States Patent
Serizawa et al.

(10) Patent No.: US 11,332,562 B2
(45) Date of Patent: May 17, 2022

(54) COMPOSITION

(71) Applicant: DENKA COMPANY LIMITED, Tokyo (JP)

(72) Inventors: Shinya Serizawa, Shibukawa (JP); Makiko Sasaki, Shibukawa (JP); Gosuke Nakajima, Shibukawa (JP)

(73) Assignee: DENKA COMPANY LIMITED, Tokyo (JP)

(*) Notice: Subject to any disclaimer, the term of this patent is extended or adjusted under 35 U.S.C. 154(b) by 8 days.

(21) Appl. No.: 16/335,607

(22) PCT Filed: Oct. 4, 2017

(86) PCT No.: PCT/JP2017/036195
§ 371 (c)(1),
(2) Date: Mar. 21, 2019

(87) PCT Pub. No.: WO2018/066619
PCT Pub. Date: Apr. 12, 2018

(65) Prior Publication Data
US 2019/0284437 A1 Sep. 19, 2019

(30) Foreign Application Priority Data
Oct. 6, 2016 (JP) .............................. JP2016-197675

(51) Int. Cl.
*C08F 220/18* (2006.01)
*C08L 9/02* (2006.01)
*C08L 33/10* (2006.01)
*C09J 4/06* (2006.01)
*C08F 2/44* (2006.01)
*C08F 290/04* (2006.01)
*C08F 279/02* (2006.01)
*C08F 222/10* (2006.01)

(52) U.S. Cl.
CPC .......... *C08F 220/1818* (2020.02); *C08F 2/44* (2013.01); *C08F 220/1811* (2020.02); *C08F 279/02* (2013.01); *C08F 290/04* (2013.01); *C08F 290/048* (2013.01); *C08L 9/02* (2013.01); *C08L 33/10* (2013.01); *C09J 4/06* (2013.01); *C08F 222/102* (2020.02); *C08F 222/103* (2020.02)

(58) Field of Classification Search
CPC ............................. C09J 4/06; C08F 220/1818
See application file for complete search history.

(56) References Cited

U.S. PATENT DOCUMENTS

| | | | | |
|---|---|---|---|---|
| 3,890,407 A | 6/1975 | Briggs, Jr. et al. | | 260/878 |
| 4,096,201 A | 6/1978 | Kishi et al. | | 260/879 |
| 4,536,546 A * | 8/1985 | Briggs | | C09J 4/06 525/71 |
| 4,769,419 A * | 9/1988 | Dawdy | | C08C 19/36 525/111 |
| 5,112,691 A * | 5/1992 | Briggs | | C09J 4/06 428/412 |
| 5,863,989 A * | 1/1999 | Taguchi | | C08F 290/062 525/245 |
| 5,932,625 A * | 8/1999 | Watanabe | | C08F 2/44 522/33 |
| 6,433,091 B1 * | 8/2002 | Cheng | | C08F 290/048 156/327 |
| 2006/0240259 A1 * | 10/2006 | Toyoda | | B22F 1/0059 428/403 |
| 2014/0158280 A1 * | 6/2014 | Kurimura | | C03C 27/10 156/64 |

FOREIGN PATENT DOCUMENTS

| | | |
|---|---|---|
| EP | 0 802 249 A1 | 10/1997 |
| JP | S 49-132119 A | 12/1974 |
| JP | S 53-2543 A | 1/1978 |
| JP | 1-282206 A | 11/1989 |
| JP | 5-306378 A | 11/1993 |
| JP | 05306378 * | 11/1993 |
| JP | 7-37274 A | 2/1995 |
| JP | 9-241585 A | 9/1997 |
| JP | 2005-54107 A | 3/2005 |
| JP | 2006-269041 A | 10/2006 |
| JP | 2010-79958 A | 4/2010 |
| JP | 2010079958 * | 4/2010 |

OTHER PUBLICATIONS

Notification of Transmittal of Translation of the International Preliminary Report on Patentability dated Apr. 18, 2019, issued by the International Bureau of WIPO in corresponding application PCT/JP2017/036195.
Extended European Search Report dated Sep. 17, 2019, issued to European Application No. 17858456.1.

* cited by examiner

Primary Examiner — Irina Krylova
(74) Attorney, Agent, or Firm — Stein IP, LLC

(57) ABSTRACT

An object of the present invention is to provide a composition comprising components of (1) to (3): (1) a polymerizable monomer comprising components of (1-1) to (1-3): (1-1) a tricyclic monofunctional (meth)acrylate in which the tricyclic ring is alicyclic, (1-2) a tricyclic bifunctional (meth)acrylate in which the tricyclic ring is alicyclic, and (1-3) a bifunctional (meth)acrylate having a bisphenol structure; (2) a polymerization initiator; and (3) a reducing, and wherein (1) the polymerizable monomer comprises 40 to 75% by mass of (1-1) the tricyclic monofunctional (meth)acrylate, 10 to 40% by mass of (1-2) the tricyclic bifunctional (meth)acrylate, and 15 to 40% by mass of the (1-3) the bifunctional (meth)acrylate having the bisphenol structure.

5 Claims, No Drawings

COMPOSITION

CROSS-REFERENCE TO RELATED APPLICATIONS

This application is a national stage of International Application No. PCT/JP2017/036195 filed Oct. 4, 2017, which claims the benefit of priority to Japanese Application No. 2016-197675, filed Oct. 6, 2016, in the Japanese Patent Office, the disclosures of which are incorporated herein in their entireties by reference.

TECHNICAL FIELD

The present invention relates to a composition containing a polymerizable monomer. It relates to, for example, an adhesive composition wherein the polymerizable monomer is a polymerizable (meth)acrylic acid derivative.

BACKGROUND ART

The demand for a room-temperature rapid-curing adhesive has been increasing year after year, from the viewpoint of labor saving, resource saving and energy saving. Conventionally, second-generation acrylic adhesives (SGA) have been known as the room-temperature rapid-curing adhesive.

SGA is a two-component adhesive, however, it requires no accurate weighting of the two components, and it can cure at room temperature regardless of imprecise weighting or blending, therefore, it provides the higher work efficiency. Furthermore, SGA provides a higher peel strength and impact resistance, and it is widely used. Such SGA is disclosed in Patent Documents 1 and 2.

Patent Document 3 discloses a two-component adhesive composition comprising a novolak type vinyl ester, (B) a bisphenol A type vinyl ester having a number average molecular weight of 800 or more, and (C) at least one (meth)acrylate ester compound having 6 to 12 carbon atoms of a molecular structure excluding (meth) acryloxy moiety, selected from alkyl (meth)acrylate, alkoxyalkyl (meth)acrylate, alkylpolyalkylene glycol (meth)acrylate, alkoxypolyalkylene glycol (meth)acrylate, polyalkylenedi(meth)acrylate, and polyalkylene glycol di(meth)acrylate, (D) an organic peroxide and (E) a curing accelerator. However, it does not disclose any tricyclic bifunctional (meth)acrylate.

Patent Document 4 discloses a heat-resistant acrylic adhesive composition comprising (a) 10 to 150 parts by mass of methacrylic acid, (b) 100 parts by mass of (meth)acrylic monomer other than methacrylic acid, but containing isobornyl (meth)acrylate as an essential component, (c) 5 to 60 parts by mass of liquid rubber having a polymerizable unsaturated double bond at the terminal, and (d) an organic peroxide, and (e) an reducing agent as an essential component for forming a redox catalyst system with the organic peroxide. However, it does not disclose any tricyclic bifunctional (meth)acrylate.

CITATION LIST

Patent Literature

Patent Document 1: Japanese Patent Application Laid-open Publication No. S49-132119A
Patent Document 2: Japanese Patent Application Laid-open Publication No. 553-2543A
Patent Document 3: Japanese Patent Application Laid-open Publication No. 2005-54107A
Patent Document 4: Japanese Patent Application Laid-open Publication No. H09-241585A

SUMMARY OF INVENTION

Technical Problem

The conventional SGA disclosed in Patent Documents 1 and 2 has been required to improve heat resistance for the use in a high temperature atmosphere. The conventional composition disclosed in Patent Document 3 also should be cured by heating and will probably have the problem in use at low temperature, because an elastomer component is not contained. In addition, the conventional heat-resistant composition disclosed in Patent Document 4 contains a methacrylic acid as an essential component, but in recent years, the adhesives not containing components with strong order, such as the methacrylic acid, have been focused.

An adhesive which can be used under a high-temperature atmosphere includes an epoxy adhesive, but it often needs to be heated at the curing process, and the peeling strength thereof is lower, regardless of the higher tensile shear strength.

Therefore, the demand for SGA which has a higher tensile shear strength and higher peeling strength, and which can be cured at room temperature has been increased.

Solution to Problem

An object of the present invention is to provide an adhesive composition which solves the above problems, for example, exhibits a higher tensile shear strength or peel strength even at high temperature.

The present invention may provide the below embodiments. A composition contains components of (1) to (3): (1) a polymerizable monomer comprising components of (1-1) to (1-3): (1-1) a tricyclic monofunctional (meth)acrylate in which the tricyclic ring is alicyclic, (1-2) a tricyclic bifunctional (meth)acrylate in which the tricyclic ring is alicyclic, and (1-3) a bifunctional (meth)acrylate having a bisphenol structure; (2) a polymerization initiator; and (3) a reducing agent, and wherein (1) the polymerizable monomer comprises 40 to 75% by mass of (1-1) the tricyclic monofunctional (meth)acrylate, 10 to 40% by mass of (1-2) the tricyclic bifunctional (meth)acrylate, and 15 to 40% by mass of (1-3) the bifunctional (meth)acrylate having the bisphenol structure. The composition may further contain (4) the elastomer, wherein (4) the elastomer contains (4-1) an elastomer having a polymerizable unsaturated double bond at the terminal. The composition may further contain (4) the elastomer, wherein (4) the elastomer contains (4-2) an elastomer having no polymerizable unsaturated double bond at the terminal. The composition may further contain (4) the elastomer, wherein (4) the elastomer contains (4-3) a methyl (meth)acrylate/butadiene/(meth)acrylonitrile/styrene copolymer. The composition may further contain (4) the elastomer, wherein (4) the elastomer contains (4-1) the elastomer having the polymerizable unsaturated double bond at the terminal, (4-2) the elastomer having no polymerizable unsaturated double bond at the terminal, and (4-3) the methyl (meth)acrylate/butadiene/(meth)acrylonitrile/styrene copolymer. The composition may further contain (4) the elastomer, wherein the content of a (meth)acrylonitrile in (4) the elastomer is 20 mol % or less. The composition may be divided into a first component and a second component, wherein the first component contains at least (2) the polymerization initiator and the second component contains at least (3) the reducing agent. A curable resin composition may contain such composition, and an adhesive composition contains such composition. A bonded body is to be bonded with such adhesive composition.

Advantageous Effects of Invention

The adhesive composition according to the present invention can exhibit a higher tensile shear strength or peel strength even at high temperature.

DESCRIPTION OF EMBODIMENTS (Polymerizable Monomer)
The polymerizable monomer may be radically polymerizable monomers. Among of them, a polymerizable vinyl monomer may be preferably used from the viewpoint of curing speed and adhesiveness. Among of the polymerizable vinyl monomers, a polymerizable (meth)acrylic acid derivative may be preferably used. 70 parts by mass or more of the polymerizable (meth) acrylic acid derivatives may be preferably contained in 100 parts by mass of the polymerizable monomer, and 100 parts by mass of the polymerizable (meth) acrylic acid derivatives may be more preferable. Here, the polymerizable (meth)acrylic acid derivative refers to a polymerizable acrylic acid derivative or a polymerizable methacrylic acid derivative. Such derivatives are usually used in the form of liquid or solid. Among the polymerizable (meth)acrylic acid derivatives, a (meth)acrylate may be preferably used. Monofunctional (meth)acrylate refers to a compound having one (meth)acryloyl group. Bifunctional (meth)acrylate refers to a compound having two (meth) acryloyl groups.

The polymerizable monomer may preferably comprise (1-1) a tricyclic monofunctional (meth)acrylate in which the tricyclic ring is alicyclic, (1-2) a tricyclic bifunctional (meth) acrylate, and (1-3) a bifunctional (meth)acrylate having a bisphenol structure.

(Tricyclic Monofunctinal (Meth)Acrylate)
The tricyclic monofunctional (meth)acrylate refers to a tricyclic monofunctional (meth)acrylate in which the tricyclic ring is alicyclic. Tricycle refers to three connected rings. The tricyclic monofunctional (meth)acrylate according to the present invention refers to a monofunctional (meth) acrylate having an alicyclic hydrocarbon group containing three connected rings. The alicyclic hydrocarbon group may preferably be an unsubstituted saturated hydrocarbon group. Among the tricyclic monofunctional (meth)acrylates, a monofunctional (meth)acrylate having a structure containing a dicyclopentane skeleton and one ring connected thereto, or a dicyclopentadiene skeleton may be preferably used. The monofunctional (meth)acrylate having structure containing the dicyclopentane skeleton and one ring connected thereto, or the dicyclopentadiene skeleton may include dicyclopentenyl (meth)acrylate, dicyclopentenyloxyethyl (meth)acrylate, and dicyclopentenyl (meth)acrylate. Among these, the dicyclopentenyl (meth)acrylate may be preferably used. The dicyclopentenyl (meth)acrylate may include FA-513M produced by Hitachi Chemical Company, Ltd.

The tricyclic monofunctional (meth)acrylate may be preferably used in the range of 40 to 75% by mass, and most preferably 50 to 65% by mass in (1) the polymerizable monomer. The numerical range mentioned herein includes an upper limit value and a lower limit value unless otherwise specified.

(Tricyclic Bifunctional (Meth)Acrylate)
The tricyclic bifunctional (meth)acrylate refers to a tricyclic bifunctional (meth)acrylate in which the tricyclic ring is alicyclic. Tricycle refers to three connected rings. The tricyclic bifunctional (meth)acrylate according to the present invention refers to a bifunctional (meth)acrylate having an alicyclic hydrocarbon group containing three connected rings. The alicyclic hydrocarbon group may preferably be an unsubstituted saturated hydrocarbon group. Among the tricyclic bifunctional (meth)acrylates, a bifunctional (meth) acrylate having a structure containing a dicyclopentane skeleton and one ring connected thereto, or a dicyclopentadiene skeleton may be preferably used. The bifunctional (meth)acrylate having the structure containing the dicyclopentane skeleton and one ring connected thereto, or the dicyclopentadiene skeleton may include a tricyclodecane dimethanol di(meth)acrylate. The tricyclodecane dimethanol di(meth)acrylate may include NK ester "A-DCP" or "DCP" produced by Shin-Nakamura Chemical Co., Ltd.

The tricyclic bifunctional (meth)acrylate may be preferably used in the range of 10 to 40% by mass, and most preferably 10 to 30% by mass in (1) the polymerizable monomer.

The tricyclic monofunctional (meth)acrylates and tricyclic bifunctional (meth)acrylates can be obtained, for example, by a reaction of a (meth)acrylic acid with a tricyclic hydrocarbons containing at least one double bond. The tricyclic hydrocarbon may include a dicyclopentadiene, gurjunene, aristolene, cedrene, bourbonene, and tricycloalkene. Among these, the dicyclopentadiene may be preferably used.

(Bifunctional Polymerizable Monomer Having a Bisphenol Structure)
A bifunctional (meth)acrylate having a bisphenol structure may preferably be a di(meth)acrylate having two (meth) acryloyl groups via an oxyalkylene structure at the end of the bisphenol skeleton. The oxyalkylene structure may have a hydroxyl group. Among (1-3), the compounds represented by the general formula (A) may be preferably used.

Formula (A)

[Formula 1]

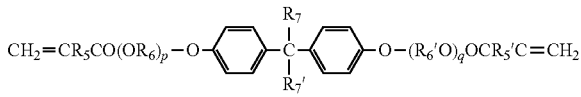

(In the formula (A), $R_5$ and $R_{5'}$ represent a hydrogen atom or a methyl group. $R_5$ and $R_{5'}$ may be the same or different, $R_6$ and $R_{6'}$ represent an alkylene group. The alkylene group may have a hydroxyl group. $R_6$ and $R_{6'}$ may be the same or different. $R_7$ and $R_{7'}$ represents a hydrogen atom or an alkyl group having 1 to 4 carbon atoms. $R_7$ and $R_{7'}$ may be the same or different. p and q each independently represent a number of 1 to 20. p and q may be the same or different.)

In the general formula (A) of (1-3), $R_6$ and $R_6'$ may preferably be an alkylene group no having a hydroxyl group, from the viewpoint of the storage stability.

(1-3) The bifunctional (meth)acrylate in which $R_6$ and $R_6'$ are the alkylene group no having a hydroxyl group may include NK ester "BPE-100" (produced by Shin-Nakamura Chemical Co., Ltd.), NK ester "BPE-200" (produced by Shin-Nakamura Chemical Co., Ltd.), NK ester "BPE-500" (produced by Shin-Nakamura Chemical Co., Ltd.), light ester "BP-2EM" (produced by Kyoeisha Chemical Co., Ltd.), light ester "BP-6EM" (produced by Kyoeisha Chemical Co., Ltd.), M-211B (produced by Toagosei Co., Ltd.), Miramer M241 (produced by Miwon Specialty Chemical Co., Ltd.), Miramer M245 (produced by Miwon Specialty Chemical Co., Ltd.), Miramer M249 (produced by Miwon Specialty Chemical Co., Ltd.), Miramer M2101 (produced by Miwon Specialty Chemical Co., Ltd.). One or more of these may be used.

Among them, the followings may be preferable, from the viewpoint of resin strength. $R_5$ and $R_5'$ may preferably be a methyl group. $R_6$ and $R_6'$ may preferably be an alkylene group having 1 to 12 carbon atoms, and more preferably an ethylene group. The alkylene group may preferably have no hydroxyl group.

The value of p+q may be preferably 15 or less, more preferably 10, from the viewpoint of the resin properties and the combustion resistance of the cured products. p and q may be each independently a number of 1 to 20, preferably 1 to 8, more preferably 5.

The bifunctional (meth)acrylate having the bisphenol structure may be preferably used in the range of 15 to 40% by mass, more preferably 15 to 30% by mass in (1) the polymerizable monomer.

Furthermore, the curable resin composition according to the present invention can use a polymerizable component other than the polymerizable monomer in combination. Such polymerizable component may include a polycarboxylic acid having a polymerizable unsaturated bond such as maleic acid, maleic anhydride, fumaric acid, itaconic acid, itaconic anhydride and citraconic acid, a monocarboxylic acid such as crotonic acid and isocrotonic acid, and a polymerizable olefinic hydrocarbon having 6 or more carbon atoms. One or more of these may be used.

The polymerizable component other than the polymerizable monomer may preferably be used less than 30 parts by mass with respect to 100 parts by mass of the polymerizable monomer, from the viewpoint of such as curing rate.

(Polymerization Initiator)

(2) The polymerization initiator according to the present invention may preferably be a thermal radical polymerization initiator. Among the thermal radical polymerization initiators, organic peroxide may be preferably used from the viewpoint of reactivity.

The organic peroxide may include cumene hydroperoxide, paramenthane hydroperoxide, and tertiary butyl hydroperoxide. Among these, the cumene hydroperoxide may be preferably used from the viewpoint of reactivity.

The organic peroxide may be preferably used in the range of 0.1 to 20 parts by mass, more preferably 0.5 to 15 parts by mass, with respect to 100 parts by mass of the polymerizable monomer. If it is less than 0.1 parts by mass, the curing rate might be lower, and if it is exceeds 20 parts by mass, the storage stability might be worse.

(Reducing Agent)

(3) The reducing agent used in the present invention may be any known reducing agent which reacts with the polymerization initiator to generate radicals. The reducing agent may include tertiary amines, thiourea derivatives, and transition metal salts.

The tertiary amine may include triethylamine, tripropylamine, tributylamine, and N,N-dimethylparatoluidine. The thiourea derivative may include 2-mercaptobenzimidazole, methylthiourea, dibutylthiourea, ethylenethiourea, acetyl-2-thiourea, benzoylthiourea, N,N-diphenylthiourea, N,N-diethylthiourea, N,N-dibutylthiourea, and tetramethylthiourea. The transition metal salt may include cobalt naphthenate, copper naphthenate, and vanadyl acetylacetonate. Among the transition metal salts, the vanadyl acetylacetonate may be preferably used. One or more kinds of them may be used in combination. Among these, the transition metal salts may be preferably used.

The reducing agent may be preferably used in the range of 0.01 to 10 parts by mass, more preferably from 0.1 to 5 parts by mass, with respect to 100 parts by mass of the polymerizable monomer. If it is less than 0.01 parts by mass, the curing rate might be slower, and if it exceeds 10 parts by mass, the storage stability might be worse.

(Elastomer)

(4) The elastomer may be preferably used in the curable resin composition according to the present invention, for the purpose of improvement of the peel strength and impact resistance.

The elastomer according to the present invention refers to a polymeric substance having rubbery elasticity at room temperature, and it may be preferably dissolved or dispersed in the polymerizable monomer.

The elastomers may include butadiene polymers, (meth)acrylonitrile/butadiene (meth)acrylic acid copolymers, (meth)acrylonitrile/butadiene/methyl (meth)acrylate copolymers, methyl (meth)acrylate/butadiene/(meth)acrylonitrile/styrene copolymer, butadiene/styrene/methyl (meth)acrylate copolymer, various synthetic rubbers such as (meth)acrylonitrile/butadiene rubber, linear polyurethane, and styrene/butadiene, natural rubber, and various thermoplastic elastomers. Such elastomer components may be used alone or in combination, as long as the compatibility has no problem.

The elastomer may have a polymerizable unsaturated double bond at the terminal and may have no polymerizable unsaturated double bond at the terminal. When the elastomer has the polymerizable unsaturated double bond at the terminal, the viscosity of the adhesive would be higher and the coatablity can be maintained. When the elastomer has the polymerizable unsaturated double bond at the terminal, the elastomer may preferably be a compound having the polymerizable unsaturated double bond at both terminals.

The compound having the polymerizable unsaturated double bond may preferably be a (meth)acryloyl group and/or a vinyl group, and more preferably the (meth)acryloyl group from the viewpoint of good reactivity.

For introducing the polymerizable unsaturated double bond into both terminals of the molecular chain of the elastomer, for example, carboxyl groups may be introduced into the both terminals of the elastomer, and the carboxyl group may be reacted with glycidyl (meth)acrylate, or the carboxyl group may be dehydrated with hydroxy (meth)acrylate. Alternatively, a diisocyanate and the hydroxy (meth)acrylate may be reacted in advance and reacted with a liquid rubber having a reactive hydroxyl group at the terminal.

Among these, the elastomer obtained by introducing the carboxyl group into both terminals of the elastomer and then reacting the carboxyl group with the glycidyl (meth)acrylate may be preferably used. A rubber obtained by using (meth)acrylonitrile rubber as a rubber component, introducing the carboxyl groups at both terminals of the rubber component and reacting the carboxyl groups with the glycidyl methacrylate may include "Hypro 1300×33 LC VTBNX" produced by An Emerald Performance material Co., Ltd.

The (meth)acrylonitrile as a component of the elastomer, such as a (meth)acrylonitrile/butadiene rubber structure may be preferably contained in the following range, form the viewpoint of the higher peel strength and the impact resistance at low temperature. The content of the (meth)acrylonitrile may preferably be 30 mol % or less, more preferably 25 mol % or less, most preferably 20 mol % or less. The content of the (meth)acrylonitrile may preferably be 1 mol % or more, more preferably 3 mol % or more, most preferably 10 mol % or more. When the content of the (meth)acrylonitrile is 10 mol % or more, the effect of the present invention can be easily obtained, and when the content of the (meth)acrylonitrile is 30 mol % or less, corrosion would be unlikely to be occurred, even if the adhered objective is a metal such as a copper.

The elastomer may be preferably composed from one or more of (4-1) the elastomer having the polymerizable unsaturated double bond at the terminal, (4-2) the elastomer having no polymerizable unsaturated double bond at the terminal, and (4-3) the methyl (meth)acrylate/butadiene/(meth)acrylonitrile/styrene copolymer, and more preferably be composed from (4-1) the elastomer having the polymerizable unsaturated double bond at the terminal, (4-2) the elastomer having no polymerizable unsaturated double bond at the terminal, and (4-3) the methyl (meth)acrylate/butadiene/(meth)acrylonitrile/styrene copolymer, from the viewpoint of the higher solubility to the polymerizable monomer and the better adhesiveness. (4-1) The elastomer having the polymerizable unsaturated double bond at the terminal and (4-2) the elastomer having no polymerizable unsaturated double bond at the terminal may preferably exclude (4-3) the methyl (meth)acrylate/butadiene/(meth)acrylonitrile/styrene copolymer.

When (4-1) the elastomer having the polymerizable unsaturated double bond at the terminal, (4-2) the elastomer having no polymerizable unsaturated double bond at the terminal, and (4-3) the methyl (meth)acrylate/butadiene/(meth)acrylonitrile/styrene copolymer are contained, the content ratio thereof is (4-1):(4-2):(4-3)=5 to 30:30 to 80:10 to 50, more preferably 10 to 20:50 to 70:20 to 30 in the mass ratio of 100 parts by mass of total amount of (4-1), (4-2) and (4-3).

Among (4-1) the elastomer having the polymerizable unsaturated double bond at the terminal, a (meth)acrylonitrile/butadiene rubber may be preferably used. Among (4-2) the elastomer having no polymerizable unsaturated double bond at the terminal, the (meth)acrylonitrile/butadiene rubber may be preferably used. (4-3) The methyl (meth)acrylate/butadiene/(meth)acrylonitrile/styrene copolymers may be preferably other than have the polymerizable unsaturated double bond at the terminal.

The elastomer may be preferably used in the range of 5 to 50 parts by mass, more preferably 10 to 40 parts by mass, most preferably 20 to 35 parts by mass, with respect to 100 parts by mass of (1) the polymerizable monomer. If it is less than 5 parts by mass, the peeling strength and the impact resistance at low temperature might be lower, and if it exceeds 50 parts by mass, the increased viscosity might cause a worse workability and insufficient curability.

(Particulate Material)

A particulate material may be preferably used in the present invention. The particulate material not dissolved into (1) to (4) may preferably used. The particulate materials enable a cured body to be easily kept with a constant thickness, thereby, resulting in adhesiveness with the improved dimensional accuracy, and control the thickness of the cured body.

The particulate material which is not dissolved into (1) to (4) may be either of organic particles or inorganic particles.

The organic particles may include polyethylene particles, polypropylene particles, crosslinked polymethyl methacrylate particles, crosslinked polystyrene particles, and crosslinked polymethyl methacrylate polystyrene copolymer particles. The inorganic particles may include ceramic particles such as glass, silica, alumina, and titanium.

The particulate material may preferably be spherical for the purpose of the improvement in producing accuracy, that is, for the control of the thickness of the adhesive. Among these, the organic particles may be preferably used, from the viewpoint of the storage stability affected by the precipitation of the particles and the reactivity of the compositions. The polyethylene particles may be preferably used among the organic particles.

The particulate material may preferably have 20 to 200 µm of an average particle size in accordance with a laser method. The average particle size may be more preferably 35 to 150 µm, and most preferably 50 to 120 µm from the viewpoint of the dimensional accuracy. The standard deviation of the particle size and particle size distribution according to the present invention is measured by "laser diffraction particle size distribution analyzer, SALD-2200" manufactured by Shimadzu Corporation.

The particulate material may be preferably used in the range of 0.01 to 10 parts by mass, more preferably from 0.1 to 5 parts by mass, with respect to 100 parts by mass of the polymerizable monomer.

Furthermore, a paraffin may be used for the purpose of quickly curing the part in contact with the air. The paraffin may include a paraffin, carnauba wax, and beeswax.

In addition, a polymerization inhibitor may be used for the purpose of improving the storage stability. The polymerization inhibitor may include an amine type, phenol type, and quinone type.

In the embodiment of the present invention, a two-component type composition may be used. Such two-component type composition can be divided into a first component and a second component without blending all essential components for the present invention during storage. At least, the polymerization initiator and the reducing agent are blended and stored respectively in the first and second component. In such case, the first component and the second component can be simultaneously and separately applied, contacted and cured, and can be used as the two-component type composition. Each component of the two-component type composition may preferably be contained within 100 parts by mass of the total amount of the first agent and the second components.

The composition of the present invention may be used as a curable resin composition. The composition of the present invention may be used as an adhesive composition. The composition of the present invention may be bonded to an adherend to prepare a bonded body. The materials of the adherend may include, but not limited to, paper, wood, ceramic, glass, ceramics, rubber, plastic, mortar, concrete and metal, and the metal of the adherend exhibits higher adhesiveness.

EXAMPLES

Hereinafter, the present invention will be explained in detail by the following experiment examples. The content of each substance is shown in "parts by mass".

(Materials Used)

(1-1) The tricyclic monofunctional (meta)acrylate
FA-513M (produced by Hitachi Chemical Co., Ltd.): dicyclopentanyl methacrylate (1-2) The tricyclic bifunctional (meth)acrylate
NK Ester DCP (produced by Shin-Nakamura Chemical Co., Ltd.): tricyclodecanedimethanol dimethacrylate (1-3) The polymerizable monomer containing a bifunctional (meth)acrylate having a bisphenol structure BPE500 (produced by Shin-Nakamura Chemical Co., Ltd.):
2,2-bis (4-(methacryloxypolyethoxy) phenyl) propane, p=5, q=5 in the above general formula (A)

(2) The polymerization initiator

The polymerization initiator: Cumene hydroperoxide (commercially available)

(3) The reducing agent

The reducing agent: Vanadyl acetylacetonate (commercially available)

(4-1) The elastomer having the polymerizable unsaturated double bond at the terminal Hypro™1300X33LC VTBNX (produced by CVC Thermoset Specialties): An acrylonitrile-butadiene rubber having the methacryloyl group at both terminals, 18 mol % of acrylonitrile (4-2) The elastomer having no polymerizable unsaturated double bond at the terminal N240S (produced by JSR): acrylonitrile-butadiene rubber, 26 mol % of acrylonitrile
N250S (produced by JSR): acrylonitrile-butadiene rubber, 19.5 mol % of acrylonitrile (4-3) The methyl (meth)acrylate/butadiene/(meth)acrylonitrile/styrene copolymer BL-20 (produced by Denka): methyl methacrylate-butadiene-acrylonitrile-styrene copolymer, 3 mol % of acrylonitrile, provided that it does not have a polymerizable unsaturated double bond at the terminal.

Each physical property was measured as follows.

(Tensile Shear Strength (Tensile Lap-Shear Strength))

An adhesive in which a first agent and a second agent were blended was applied to one side of one single test piece (100×25×1.6 mm, iron plate, standard SPCC), thereafter, immediately laminated to the other test piece (100×25×1.6 mm, iron plate, standard SPCC), and cured at room temperature for 24 hours to prepare a specimen for measuring tensile lap-shear strength, according to JIS K-6850:1999 (Adhesives-Determination of tensile lap-shear strength of rigid-to-rigidbonded assemblies). A polyethylene filler with 100 μm of a particle size was added to the adhesive composition in order to equalize the thickness of the adhesive composition layer. The polyethylene filler was spherical. 2 parts by mass of the polyethylene filler was used with respect to 100 parts by mass of the polymerizable monomer. The tensile lap-shear strength (unit: MPa) was measured under the conditions of a temperature of 23° C. and a relative humidity of 50% with a pulling rate of 10 mm/min. Furthermore, for the evaluation of the adhesion at high temperature, a specimen cured at room temperature for 24 hours was heated with a high-temperature bath SPHH-201 (registered trademark, manufactured by ESPEC Corp.) at 80° C. for 30 minutes and then measured in the same manner under 80° C. atmosphere.

The tensile shear strength at room temperature is preferably 18 MPa or more and the tensile shear strength under 80° C. atmosphere is preferably 14 MPa or more, because the adhesive strength could be exhibited sufficiently both at room temperature and high temperature.

(T-Type Peel Strength)

An adhesive in which a first agent and a second agent were blended was applied to one side of one single test piece (200×25×1.0 mm, aluminum plate, standard A5052P), thereafter, immediately laminated to the other test piece (200×25×1.0 mm, aluminum plate, standard A5052P), and cured at room temperature for 24 hours to prepare a specimen for measuring peeing strength of the adhesive, according to JIS K-6854-3:1999, (Adhesives-Determination of peel strength of bonded assemblies). A polyethylene filler with 100 μm of a particle size was added to the adhesive composition in order to equalize the thickness of the adhesive composition layer. The polyethylene filler was spherical. 2 parts by mass of the polyethylene filler was used with respect to 100 parts by mass of the polymerizable monomer. The peel strength (unit: kN/m) was measured under the conditions of a temperature of 23° C. and a relative humidity of 50% with a pulling rate of 50 mm/min. Furthermore, for the evaluation of the cold resistance, a specimen cured at room temperature for 24 hours was cooled with a low-temperature incubator WU-200 (registered trademark, manufactured by ESPEC Corp.) at −20° C. for 30 minutes and then measured in the same manner under −20° C. atmosphere.

The T-type peel strength at room temperature is preferably 3.0 kN/m or more and the T-type peel strength at −20° C. atmosphere is preferably 1.5 kN/m or more, because the adhesive strength could be exhibited sufficiently both at room temperature and low temperature.

Example 1

The first component and the second component were prepared for the compositions shown in Table 1.

For the elastomer, 15% by mass of (4-1) the elastomer having a polymerizable unsaturated double bond at the terminal, 60% by mass of (4-2) the elastomer having no polymerizable unsaturated double bond at the terminal, 25% by mass of (4-3) the methyl (meth)acrylate/butadiene/(meth)acrylonitrile/styrene copolymer were used in 100% by mass of the total of (4-1), (4-2) and (4-3). 30 parts by mass of the elastomer was used with respect to 100 parts by mass of (1) the polymerizable monomer. An equal amount of the first component and the second component were blended to prepare an adhesive composition. The tensile shear strength and T-type peel strength for the adhesive composition were measured. The results are also shown in Table 1.

Examples 2 to 11

As shown in Table 1, Examples 2 to 11 were carried out in the same manner as in Example 1, except that the blending ratio of the polymerizable monomer was changed. The results are also shown in Table 1.

As shown in Table 1, when (1) the polymerizable monomer contained 40 to 75% by mass of (1-1) the tricyclic monofunctional (meth)acrylate, 10 to 40% by mass of (1-2) the tricyclic bifunctional (meth)acrylate, and 15 to 40% by mass of (1-3) the bifunctional (meth)acrylate having the bisphenol structure, both of the tensile shear strength and the T-type peel strength showed higher adhesive strength. On the other hand, when either of the above conditions was not satisfied, the tensile shear strength or T-type peel strength was lower.

Example 12

Example 12 was carried out in the same manner as in Example 1, except that an acrylonitrile-butadiene rubber (26 mol % of acrylonitrile) was used as (4-2) the elastomer having no polymerizable unsaturated double bond at the terminal. The results are also shown in Table 1. As shown in Table 1, the T-type peel strength at 23° C. was higher, but the T-type peel strength at −20° C. was lower.

TABLE 1-1

|  |  |  |  | Example 1 Example | | Example 2 Example | | Example 3 Comparative Example | | Example 4 Example | |
|---|---|---|---|---|---|---|---|---|---|---|---|
|  |  |  |  | First Component | Second Component | First Component | Second Component | First Component | Second Component | First Component | Second Component |
| (1-1) | Monomer 1 | FA-513M | dicyclopentenyl methacrylate | 60 | 60 | 40 | 40 | 30 | 30 | 70 | 70 |
| (1-2) | Monomer 2 | DCP | tricyclodecane dimethanol dimethacrylate | 15 | 15 | 30 | 30 | 35 | 35 | 10 | 10 |
| (1-3) | Monomer 3 | BPE-500 | 2,2-bis (4-(methacryloxy-polyethoxy) phenyl) propane | 25 | 25 | 30 | 30 | 35 | 35 | 20 | 20 |
| (2) | Polymerization Initiator |  | Cumene hydroperoxide | 4 |  | 4 |  | 4 |  | 4 |  |
| (3) | Reducing Agent |  | Vanadyl acetylacetonate |  | 0.4 |  | 0.4 |  | 0.4 |  | 0.4 |
| (4) | Elastomer |  | Total amount of Elastomer 1 to 4 | 30 | 30 | 30 | 30 | 30 | 30 | 30 | 30 |
| (4-1) | Elastomer 1 | Hypro 1300X33LC VTBNX | Acrylonitrile-butadiene rubber having methacryloyl groups at both terminals (AN 18%) | 15% | 15% | 15% | 15% | 15% | 15% | 15% | 15% |
| (4-2) | Elastomer 2 | N240S | Acrylonitrile-butadiene rubber (AN 26%) |  |  |  |  |  |  |  |  |
| (4-2) | Elastomer 3 | N250S | Acrylonitrile-butadiene rubber (AN 19.5%) | 60% | 60% | 60% | 60% | 60% | 60% | 60% | 60% |
| (4-3) | Elastomer 4 | BL-20 | Methyl methacrylate/butadiene/acrylonitrile/styrene copolymer (AN 3%) | 25% | 25% | 25% | 25% | 25% | 25% | 25% | 25% |
| Tensile shear strength (MPa) |  | 23° C. |  | 21.8 | | 20.2 | | 20.2 | | 22.2 | |
|  |  | 80° C. |  | 15.8 | | 15.2 | | 15.2 | | 15.9 | |
| T-type peel strength (kN/m) |  | −20° C. |  | 2.5 | | 2.4 | | 0.7 | | 2.2 | |
|  |  | 23° C. |  | 3.7 | | 3.5 | | 3.0 | | 3.3 | |

|  |  |  |  | Example 5 Comparative Example | | Example 6 Example | |
|---|---|---|---|---|---|---|---|
|  |  |  |  | First Component | Second Component | First Component | Second Component |
| (1-1) | Monomer 1 | FA-513M | dicyclopentenyl methacrylate | 80 | 80 | 60 | 60 |
| (1-2) | Monomer 2 | DCP | tricyclodecane dimethanol dimethacrylate | 10 | 10 | 10 | 10 |
| (1-3) | Monomer 3 | BPE-500 | 2,2-bis (4-(methacryloxy-polyethoxy) phenyl) propane | 10 | 10 | 30 | 30 |
| (2) | Polymerization Initiator |  | Cumene hydroperoxide | 4 |  | 4 |  |
| (3) | Reducing Agent |  | Vanadyl acetylacetonate |  | 0.4 |  | 0.4 |
| (4) | Elastomer |  | Total amount of Elastomer 1 to 4 | 30 | 30 | 30 | 30 |
| (4-1) | Elastomer 1 | Hypro 1300X33LC VTBNX | Acrylonitrile-butadiene rubber having methacryloyl groups at both terminals (AN 18%) | 15% | 15% | 15% | 15% |
| (4-2) | Elastomer 2 | N240S | Acrylonitrile-butadiene rubber (AN 26%) |  |  |  |  |
| (4-2) | Elastomer 3 | N250S | Acrylonitrile-butadiene rubber (AN 19.5%) | 60% | 60% | 60% | 60% |
| (4-3) | Elastomer 4 | BL-20 | Methyl methacrylate/butadiene/acrylonitrile/styrene copolymer (AN 3%) | 25% | 25% | 25% | 25% |

TABLE 1-1-continued

|  |  |  |  |
|---|---|---|---|
| Tensile shear strength | 23° C. | 22.3 | 22.1 |
| (MPa) | 80° C. | 16.5 | 15.5 |
| T-type peel strength | −20° C. | 0.5 | 2.6 |
| (kN/m) | 23° C. | 2.5 | 3.8 |

Each component is shown in "part by mass".

However, elastomers 1 to 4 are shown in % by mass in 100% by mass of the total of the elastomers 1 to 4.

TABLE 1-2

|  |  |  |  |  | Example 7 Comparative Example | | Example 8 Example | | Example 9 Comparative Example | | Example 10 Example | |
|---|---|---|---|---|---|---|---|---|---|---|---|---|
|  |  |  |  |  | First Component | Second Component | First Component | Second Component | First Component | Second Component | First Component | Second Component |
| (1-1) | Monomer 1 | FA-513M | dicyclopentenyl methacrylate | | 60 | 60 | 40 | 40 | 40 | 40 | 75 | 75 |
| (1-2) | Monomer 2 | DCP | tricyolodecane dimethanol dimethacrylate | | 5 | 5 | 40 | 40 | 50 | 50 | 10 | 10 |
| (1-3) | Monomer 3 | BPE-500 | 2,2-bis (4-(methacryloxy-polyethoxy) phenyl) propane | | 35 | 35 | 20 | 20 | 10 | 10 | 15 | 15 |
| (2) | Polymerization Initiator | | Cumene hydroperoxide | | 4 | | 4 | | 4 | | 4 | |
| (3) | Reducing Agent | | Vanadyl acetylacetonate | | | 0.4 | | 0.4 | | 0.4 | | 0.4 |
| (4) | Elastomer | | Total amount of Elastomer 1 to 4 | | 30 | 30 | 30 | 30 | 30 | 30 | 30 | 30 |
| (4-1) | Elastomer 1 | Hypro 1300X33L C VTBNX | Acrylonitrile-butadiene rubber having methacryloyl groups at both terminals (AN 18%) | | 15% | 15% | 15% | 15% | 15% | 15% | 15% | 15% |
| (4-2) | Elastomer 2 | N240S | Acrylonitrile-butadiene rubber (AN 26%) | | | | | | | | | |
| (4-2) | Elastomer 3 | N250S | Acrylonitrile-butadiene rubber (AN 19.5%) | | 60% | 60% | 60% | 60% | 60% | 60% | 60% | 60% |
| (4-3) | Elastomer 4 | BL-20 | Methyl methacrylate/butadiene/acrylonitrile/styrene copolymer (AN 3%) | | 25% | 25% | 25% | 25% | 25% | 25% | 25% | 25% |
| Tensile shear strength | | | 23° C. | | 18.3 | | 21.3 | | 23.5 | | 22.6 | |
| (MPa) | | | 80° C. | | 11.4 | | 15.8 | | 16.0 | | 16.1 | |
| T-type peel strength | | | −20° C. | | 2.8 | | 1.6 | | 0.1 | | 1.6 | |
| (kN/m) | | | 23° C. | | 4.2 | | 3.0 | | 2.2 | | 3.1 | |

|  |  |  |  |  | Example 11 Comparative Example | | Example 12 Example | |
|---|---|---|---|---|---|---|---|---|
|  |  |  |  |  | First Component | Second Component | First Component | Second Component |
| | (1-1) | Monomer 1 | FA-513M | dicyclopentenyl methacrylate | 50 | 50 | 60 | 60 |
| | (1-2) | Monomer 2 | DCP | tricyolodecane dimethanol dimethacrylate | 40 | 40 | 15 | 15 |
| | (1-3) | Monomer 3 | BPE-500 | 2,2-bis (4-(methacryloxy-polyethoxy) phenyl) propane | 10 | 10 | 25 | 25 |
| | (2) | Polymerization Initiator | | Cumene hydroperoxide | 4 | | 4 | |
| | (3) | Reducing Agent | | Vanadyl acetylacetonate | | 0.4 | | 0.4 |
| | (4) | Elastomer | | Total amount of Elastomer 1 to 4 | 30 | 30 | 30 | 30 |

TABLE 1-2-continued

| | | | | | | | | |
|---|---|---|---|---|---|---|---|---|
| (4-1) | Elastomer 1 | Hypro 1300X33L C VTBNX | Acrylonitrile-butadiene rubber having methacryloyl groups at both terminals (AN 18%) | 15% | 15% | 15% | 15% |
| (4-2) | Elastomer 2 | N240S | Acrylonitrile-butadiene rubber (AN 26%) | | | 60% | 60% |
| (4-2) | Elastomer 3 | N250S | Acrylonitrile-butadiene rubber (AN 19.5%) | 60% | 60% | | |
| (4-3) | Elastomer 4 | BL-20 | Methyl methacrylate/butadiene/acrylonitrile/styrene copolymer (AN 3%) | 25% | 25% | 25% | 25% |
| Tensile shear strength (MPa) | | | 23° C. | | 21.5 | | 21.5 |
| | | | 80° C. | | 16.5 | | 15.6 |
| T-type peel strength (kN/m) | | | −20° C. | | 0.2 | | 1.1 |
| | | | 23° C. | | 2.3 | | 3.1 |

Each component is shown in "part by mass".
However, elastomers 1 to 4 are shown in % by mass in 100% by mass of the total of the elastomers 1 to 4.

The adhesive composition according to an embodiment of the present invention has higher adhesive properties, and also has higher physical properties such as tensile shear strength and T-type peel strength. The adhesive composition according to an embodiment of the present invention further has higher tensile shear strength even under a high temperature atmosphere such as 80° C. or higher. The adhesive composition according to an embodiment of the present invention can also have higher T-type peel strength even under a low temperature atmosphere such as −20° C. or lower.

The invention claimed is:

1. A composition comprising:
   (1) a polymerizable monomer comprising components of (1-1) to (1-3):
      (1-1) a tricyclic monofunctional (meth)acrylate in which the tricyclic ring is alicyclic,
      (1-2) a tricyclic bifunctional (meth)acrylate in which the tricyclic ring is alicyclic, and
      (1-3) a bifunctional (meth)acrylate having a bisphenol structure;
   (2) a polymerization initiator;
   (3) a reducing agent;
   (4) an elastomer including:
      (4-1) an elastomer having a polymerizable unsaturated double bond at the terminal, including (meth)acrylonitrile,
      (4-2) an elastomer having no polymerizable unsaturated double bond at the terminal, including (meth)acrylonitrile, and
      (4-3) methyl (meth)acrylate/butadiene/(meth)acrylonitrile/styrene copolymer,
   the content ratio of the elastomers is
   (4-1):(4-2):(4-3)=10 to 20:50 to 70:20 to 30 in
   a mass ratio of 100 parts by mass of total amount of the elastomer (4-1), the elastomer (4-2) and the elastomer (4-3),
   wherein the content of the (meth)acrylonitrile in the (4) the elastomer is 10-20 mol %,
   the composition has a tensile shear strength, measured according to JIS K 6850:1999, of 14-16.1 MPa at 80° C., and
   the composition has a T-type peel strength, measured according to JIS K 6854-3:1999, of 3.0-3.8 at 23° C. and 1.5-2.6 kN/m at −20° C.,
   wherein the (1) polymerizable monomer comprises 50 to 65% by mass of the (1-1) tricyclic monofunctional (meth)acrylate, 10 to 30% by mass of the (1-2) tricyclic bifunctional (meth)acrylate, and 15 to 30% by mass of the (1-3) bifunctional (meth)acrylate having the bisphenol structure, and
   wherein an amount of the (4) elastomer is in a range of 20 to 35 parts by mass, with respect to 100 parts by mass of the (1) polymerizable monomer.

2. The composition according to claim 1, wherein the composition is divided into a first component and a second component, wherein the first component comprises at least (2) the polymerization initiator and the second component comprises at least (3) the reducing agent.

3. A curable resin composition comprising the composition according to claim 1.

4. An adhesive composition comprising the composition according to claim 1.

5. A bonded body to be bonded with the adhesive composition according to claim 4.

* * * * *

UNITED STATES PATENT AND TRADEMARK OFFICE
CERTIFICATE OF CORRECTION

PATENT NO. : 11,332,562 B2
APPLICATION NO. : 16/335607
DATED : May 17, 2022
INVENTOR(S) : Serizawa et al.

It is certified that error appears in the above-identified patent and that said Letters Patent is hereby corrected as shown below:

In the Claims

Column 16, Claim 1, Line 32 should be corrected to read:
"according to JIS K 6854-3:1999, of 3.0-3.8 kN/m at 23° C."

Signed and Sealed this
Eleventh Day of October, 2022

Katherine Kelly Vidal
*Director of the United States Patent and Trademark Office*